(No Model.)
A. H. LIMONT.
DUPLEX TUBING.
No. 400,094. Patented Mar. 26, 1889.
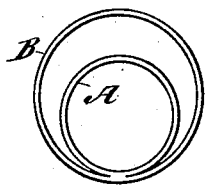
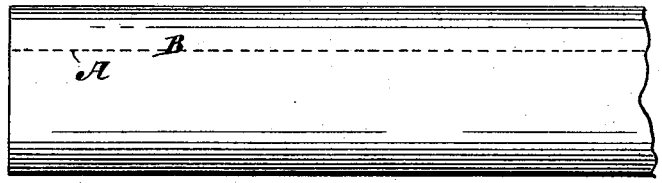
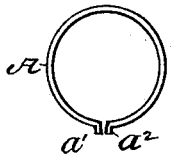
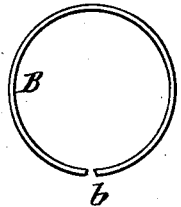
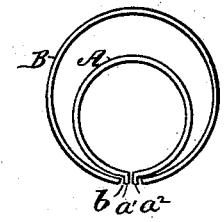
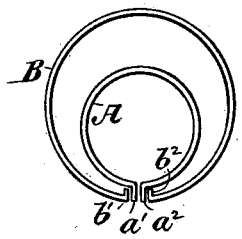
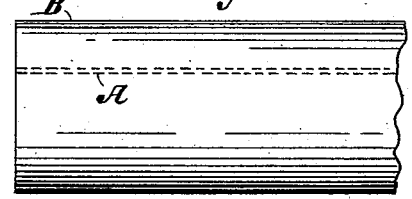
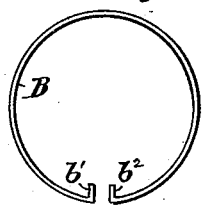
Witnesses
Wm. Robinson.
C. R. Ferguson.
Inventor
Alexander H. Limont
By his attorneys
Gifford & Brown
N. PETERS, Photo-Lithographer, Washington, D. C.

UNITED STATES PATENT OFFICE.

ALEXANDER H. LIMONT, OF WATERBURY, CONNECTICUT, ASSIGNOR TO HOLMES, BOOTH & HAYDENS, OF NEW YORK, N. Y.

DUPLEX TUBING.

SPECIFICATION forming part of Letters Patent No. 400,094, dated March 26, 1889.

Application filed December 14, 1888. Serial No. 293,545. (No model.)

*To all whom it may concern:*

Be it known that I, ALEXANDER H. LIMONT, of Waterbury, in the county of New Haven and State of Connecticut, have invented a certain new and useful Improvement in Duplex Tubing, of which the following is a specification.

My improvement relates to duplex tubing, or, in other words, to tubing having a duct or passage-way for gas and another duct or passage-way for wires used for electric lighting.

The improvement consists in two tubes arranged one within the other, one or both being ribbed and a union being effected by means of the ribbing.

In the accompanying drawings, Figure 1 is an end view of tubing made according to my improvement. Fig. 2 is a side view of the same. Fig. 3 is an end view of the inner tube. Fig. 4 is an end view of the outer tube. Fig. 5 is an end view of the two tubes fitted together, but not united. Fig. 6 is a side view of the two tubes in this condition. Fig. 7 is an end view of two tubes of modified construction, fitted together, but not united. Fig. 8 is an end view of the inner tube shown in Fig. 7. Fig. 9 is an end view of the outer tube shown in Fig. 7.

Similar letters of reference designate corresponding parts in all the figures.

A designates the inner tube.

B designates the outer tube. The inner tube is arranged within the outer tube. As shown, it is arranged eccentrically to the outer tube, so as to contact with one portion of the outer tube.

The inner tube, A, is shown as formed with a longitudinal rib composed of two outwardly-turned flanges, $a'$ $a^2$. The outer tube, B, is shown as having an opening, $b$, extending longitudinally through it. Both the tubes A and B may be made by bending a flat piece of metal laterally into tubular form.

The rib formed of the flanges $a'$ $a^2$ on the tube A is arranged to project through the opening $b$ in the tube B, with the adjacent cylindric portion of the tube A bearing against the interior cylindric portion of the tube B, adjacent to the opening $b$. The tubes will be united and their openings closed by soldering or brazing. Preferably the rib composed of the flanges $a'$ $a^2$ of the tube A will have a slight taper, so that the outside tube will bind it firmly by the spring or resilience of the metal in the outside tube. The outer tube may be wired to hold it tightly closed upon the rib of the inside tube, A, during the soldering or brazing process.

What I have said concerning my tubing applies to all the figures of the drawings. I will add that in the example of my improvement illustrated by Figs. 7, 8, and 9 the opening $b$ of the tube B has inwardly-turned edges or flanges $b'$ $b^2$, which bear against the inner tube, close to the flanges $a'$ $a^2$ of the latter, and also bear against these flanges themselves. The soldering and brazing may be done as before described.

I do not wish to be confined to the configuration of the tubes which I have illustrated, as my improvement is applicable to the production of tubing of various shapes. Both the inner and the outer tube may be angular, or either may be round and the other angular. I would also remark that the relative sizes of the two tubes used in making the tubing may be varied.

What I claim as my invention, and desire to secure by Letters Patent, is—

1. Duplex tubing composed of two separate tubes, an inner tube provided with a rib, and an outer tube provided with an opening receiving and engaging with said rib, the two tubes being closed and united, substantially as specified.

2. Duplex tubing composed of two separate tubes, an inner tube provided with a rib, made of two abutting flanges, and an outer tube provided with an opening receiving and engaging with said rib, all the tubes being closed and united, substantially as specified.

3. Duplex tubing composed of two separate tubes, an inner tube provided with a rib, made of two abutting flanges, and an outer tube provided with an opening furnished with inwardly-turned flanges and receiving and engaging with said rib, all the tubes being closed and united, substantially as specified.

ALEXANDER H. LIMONT.

Witnesses:
   GEO. H. BENHAM,
   CLIFFORD J. HACKETT.